Jan. 14, 1936.  C. B. NORRIS  2,028,076
METHOD OF MAKING PLYWOOD TRAYS OR THE LIKE
Filed June 8, 1934   2 Sheets-Sheet 1
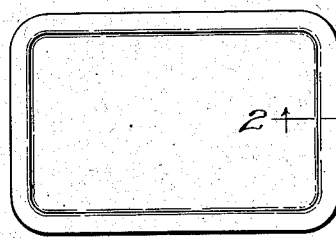
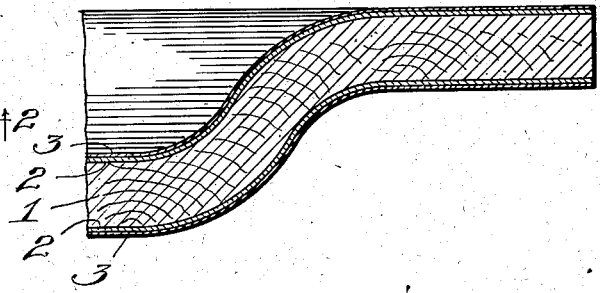
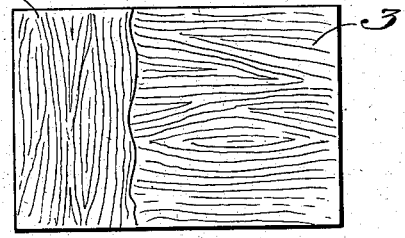
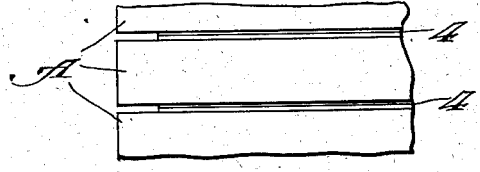
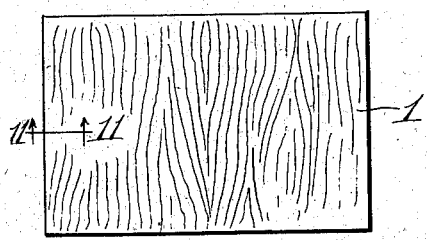
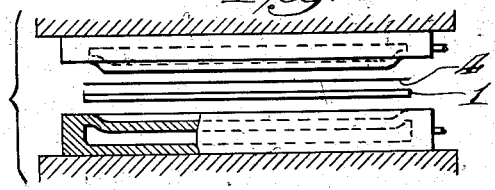
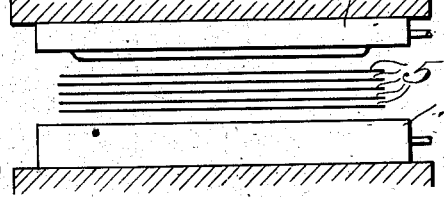
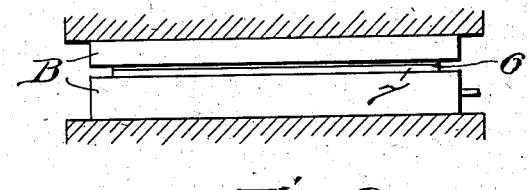
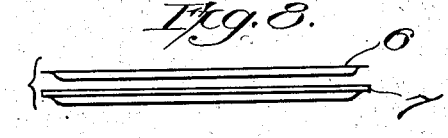
Inventor:
C. B. Norris,
by Wm. F. Freudenreich
Atty.

Jan. 14, 1936.   C. B. NORRIS   2,028,076
METHOD OF MAKING PLYWOOD TRAYS OR THE LIKE
Filed June 8, 1934   2 Sheets-Sheet 2
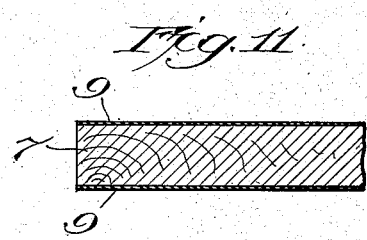
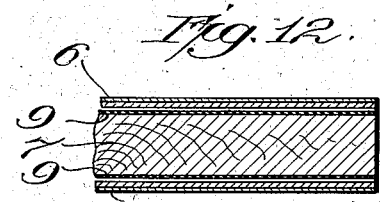
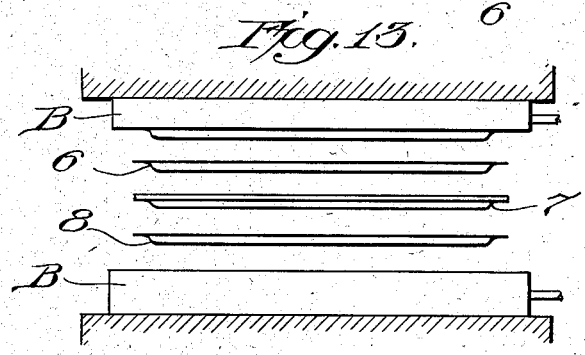
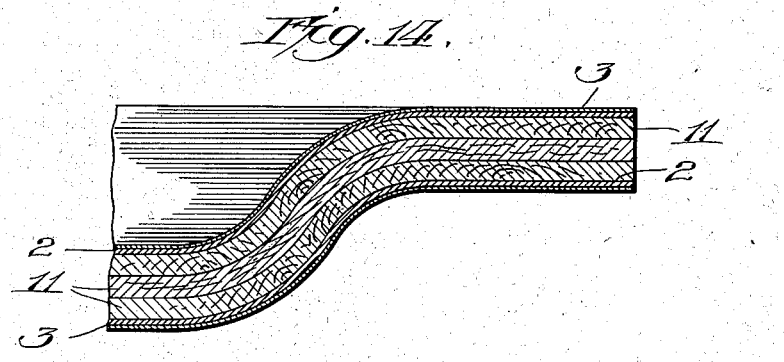
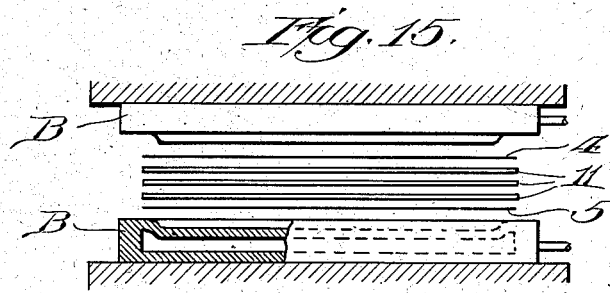

Patented Jan. 14, 1936

2,028,076

UNITED STATES PATENT OFFICE 2,028,076

METHOD OF MAKING PLYWOOD TRAYS OR THE LIKE

Charles B. Norris, Grand Rapids, Mich., assignor to Haskelite Manufacturing Corporation, a corporation of New York Application June 8, 1934, Serial No. 729,561

4 Claims. (Cl. 144—309)

The object of the present invention is to make it possible to manufacture plywood trays or the like, faced with fine woods, with the facing veneers in an unmarred condition at a comparatively low cost.

Trays can, of course, be made from flat, plywood panels which, after having been steamed, are molded between suitable heated dies, under heavy pressure. The cost of making trays by that process is comparatively great, however. Tray-like plywood structures can also be produced by simultaneously molding the several plies into shape and gluing them together; but, because of the character of the stresses set up in the wood during this process, the uneven drying action of the plies because certain plies do not come in contact with heating surfaces until the dies have been closed, and the great difficulty of accurately regulating the moisture content of each ply so as to compensate for uneven heating, it is very difficult to secure a product that is not distorted or warped. Furthermore, in this process of gluing up the plies and simultaneously molding them, a great amount of breakage occurs in the facing veneers, so that the proportion of defective trays is usually large.

In carrying out my invention, the panels of which the tray or the like is formed are pre-molded while moist and are then dried. The glue to secure the pre-molded panels together may be added in dry sheet form, or it may be applied wet to the cores and be then dried, so that all of the materials going into the press for the final gluing operations are dry, in the sense of being of low moisture content. This state of dryness, in carrying out the last step, is permissible because there is no molding of the wood at that time, but simply a pressing of the pre-formed panels into intimate relation to each other and the setting of the glue. Consequently, if the moisture be evenly distributed throughout the assembly that is to be transformed into a completed product, no stresses are set up in the wood during the final gluing step to cause the product to become distorted upon leaving the dies. Consequently, instead of being put to great pains in an endeavor very accurately to proportion the moisture contents of the several moist plies, to guard against warping in the finished product, all that is needed is to prepare the assembly of the requisite number of pre-molded panels with the dry glue interposed between the same, and allow the assembly to stand for a considerable length of time to condition the same; or, in other words, to permit such moisture as the assembly contains to distribute itself uniformly throughout the mass.

In preparing the material for a tray I prefer to glue up two-ply facing panels in a flat condition. This not only helps in reducing breakage but also enables me to sand those faces which are to be the outer faces in the finished product, while the panels are in a flat condition, thereby eliminating the necessity of hand sanding the trays after they have been completed. Such hand sanding would otherwise be required because of the comparatively low pressure at which the first gluing step in making a tray is carried out. The wood must, of course, contain considerable moisture, say from 10% to 15%, for molding purposes. Therefore the panels that are to be sanded should contain the requisite amount of moisture at the time of sanding because, if they are given a wetting afterwards, the grain in the sanded faces will rise and spoil the finish. It is, of course, not difficult to cause the wood to contain the necessary amount of moisture at the time of sanding. Since wood containing a high percentage of moisture dries out very quickly in a fairly dry atmosphere, it is necessary either to mold a panel almost immediately after it has been sanded or else to make provision against evaporation of the moisture until the panel can be molded, if the panel contained just about the proper amount of moisture at the time of sanding. It is not usually feasible to mold a panel as soon as it has been sanded, nor can a panel be effectively sanded if it be made to contain such an excess of moisture, at the time of sanding, that the molding operation may be delayed for a considerable length of time without danger that the moisture content will drop too low. In accordance with one feature of my invention, I therefore provide a simple means for guarding against the loss of moisture in a panel after it has been sanded, so that the step of molding may be deferred for a considerable length of time. When the glued facing panels leave the press in which they are glued, they are usually quite dry. I thereupon dip them in water and immediately insert them between wooden cauls, which may conveniently be plywood slabs having a thickness of half an inch or more. The facing panels are very thin, so that they do not absorb an excessive amount of moisture, much of the water entering the cauls. When a panel is to be sanded, it is removed from between its cauls, is quickly run through the sanding machine, and is then returned to its place between the cauls and remains there until it is time for it to go into the molding press. At the time of placing them in the press preparatory to gluing them together, the veneers for the face panels have about the same moisture content that they must have at the beginning of the molding operation. Therefore, when the flat, glued facing panels are moistened, before sanding, the effect is simply to restore the moisture driven out during gluing, and the panels therefore remain flat while being sanded.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a plan view of a tray made in accordance with the present invention; Fig. 2 is a section on line 2—2 of Fig. 1, on a much larger scale, showing a fragment of the tray; Fig. 3 is a plan view of one of the facing panels, a part of the upper ply being broken away, and this panel representing either the front or back facing member; Fig. 4 is a plan view of the core panel; Fig. 5 is a more or less diagrammatic view, showing fragments of facing panels and wood cauls between which the panels lie; Fig. 6 is a more or less diagrammatic view illustrating a front or upper facing panel and a core panel about to be simultaneously molded without being glued together; Fig. 7 is a view similar to Fig. 6, showing the dies closed on the work; Fig. 8 shows, in edge view, the two panels pre-molded by the steps illustrated in Figs. 6 and 7; Fig. 9 is a view similar to Fig. 6, illustrating the assembling of a plurality of back or bottom facing panels and dies for pre-molding the same; Fig. 10 is an edge view of one of the back facing panels after the pre-molding thereof; Fig. 11 shows a fragment of the core panel having glue on both faces, being a section on a larger scale on line 11—11 of Fig. 4; Fig. 12 is an edge view showing the core and the facing panels assembled in a dry state for conditioning, prior to the final step of gluing the same together; Fig. 13 is a diagrammatic view, showing a set of facing panels and a core panel, all pre-molded, between dies about to be closed upon the same to cause them to be united into a single structure; Fig. 14 is a view similar to Fig. 2, showing a tray in which the core contains three plies; and Fig. 15 is a view, similar to Figs. 6 and 9, showing the two face panels and the three core plies of the tray of Fig. 14 about to be acted upon by dies, so as to cause all of the panels going into the tray to be simultaneously pre-molded.

In the drawings I have illustrated the invention in connection with the manufacture of a comparatively large plywood tray and, for the sake of brevity, the detailed description will be confined to this particular exemplification, although it will, of course, be understood that my invention is not limited to trays as such, but is applicable to what may be termed dished structures in general, meaning thereby plywood structures molded into shapes of compound curvature as distinguished from mere bending.

The tray illustrated in Figs. 1 and 2 of the drawings is rectangular and comprises a comparatively thick core member 1 and two facings each consisting of a thin inner ply 2 and a thin outer ply 3. In the case of the tray illustrated, a flatter product is obtained by causing the grain of the inner facing layers 2 to be parallel to the grain of the core, the grain of the outer layers or plies 3, of course, extending at right angles to the grain of the inner plies 2. In order that a clear understanding may be had of the nature of the product to be produced in accordance with my invention, I may give as an example a tray having a length of almost two feet and a width of somewhat more than a foot which has been successfully manufactured in large quantities. In that particular type of tray the core is composed of sycamore and has a thickness of one-seventh of an inch. The cross bands in the facing members, namely, the plies 2, are of birch and are one sixty-fourth of an inch thick, whereas the exposed facing plies 3 are of walnut and have a thickness of one twenty-eighth of an inch. It will, of course, be understood that these dimensions are not intended to represent limits or to be determinative of proportions in general; but, as already stated, they are simply illustrative.

The multiple-ply facings are manufactured in the same way as any flat multiple-ply panels, except that they should have about the moisture content at which they will subsequently be sanded. The gluing of these facing panels dries them out. After being glued, the facing panels are moistened, restoring the moisture lost during gluing, conveniently by dipping them into water. The moist panels are then placed between flat wooden cauls A, as shown in Fig. 5. The cauls A must be reconditioned in a dry kiln, from time to time, to insure that the facing panels shall have the correct moisture content at the time of sanding. Each panel may remain between its cauls until the workmen are ready to sand it, as there will be very little loss of moisture from the panel while it remains between the cauls. In order to sand the panel it is removed from the cauls and is then immediately returned so that its moisture content will be preserved until the pre-molding operation is to be performed. At the time of pre-molding the panels, whether they be facing panels or core panels, the wood preferably contains from 10% to 15% of moisture. Wood of such moisture content can be successfully sanded. Therefore, if the veneers for a facing panel had a moisture content of from 10% to 15% at the beginning of the gluing operation, the subsequent moistening thereof to restore the moisture lost while being glued, does not make the wood too wet to be sanded; and, furthermore, this subsequent moistening of the panel will not affect its flatness and make machine sanding difficult. If there is afterwards no marring of the sanded surfaces that are to become the top and bottom faces of the completed tray, no additional sanding will be needed. Therefore, by using the proper methods to complete the manufacture of the trays, all of the sanding may be done by machine while the material is in the flat, thus costing much less than if it had to be done by hand, after the completion of the trays.

After the facing panels have been properly sanded they are pre-molded into the shapes which they are to have in a completed tray, and the core panels are also pre-molded. I have found that, if the three panels that go into an individual tray are molded simultaneously, a large proportion of the back or under facing panels may be damaged so as not to be fit for use. This is true with respect to trays like the specific example heretofore given, in which there is a sycamore core panel about one-seventh of an inch thick.

However, in such cases a front or upper facing panel, to which I shall refer as a whole by the reference character 4, and a core panel may be assembled and placed between suitable dies B, B and be successfully molded at the same time, as indicated in Figs. 6 and 7. When these panels are removed from the dies they are in the form of rudimentary trays 6 and 7, as shown in Fig. 8. The bottom or back facing panels, indicated by the reference character 5, may successfully be molded in groups of five or six, as indicated diagrammatically in Fig. 9. When the molded panels are removed from the dies they are in the form of rudimentary trays 8, as shown in Fig. 10. The molding of all of the panels is done under heat and pressure, so that the wood is dried until its moisture content is considerably below that at the beginning of the molding operations and the molded panels may therefore be said to be dry.

After the pre-molded panels have been made, a pair of facing panels and a core panel must be glued together to produce a completed tray. If the gluing is done with wet glue, warping almost invariably results and therefore the glue should be dry at the time of the actual gluing. Also, if the panels differ substantially from each other in moisture content, the tray will warp after leaving the dies. When it is desired to employ a glue that can be applied in a wet state, instead of dry sheet glue, both faces of the molded core panel may be coated with the glue, as indicated at 9 in Fig. 11, and the glue then be dried before assembling the core with its facings. In such case, after the glue has been dried, the core and front and back facing panels are assembled, as indicated in Fig. 12, and are allowed to stand for many hours to condition the same. After a sufficient length of time has elapsed, say from fourteen to twenty-four hours, the moisture content becomes practically the same in all three of the panels. The assembly is then placed in the heated dies, as diagrammatically shown in Fig. 13, and the final gluing is quickly accomplished under heat and pressure. Because of the even distribution of the moisture in the assembly at the beginning of the gluing step, no stresses are set up in the tray, during gluing, that will cause objectionable warping or other distortion in the tray after it leaves the dies in a completed form.

A further reason why the glue should be dry for the final gluing step is that, if it were tacky at the time the dies are being closed, the facing panels would stick to the core and would not adjust themselves to nest naturally one within another; with the result that there would be more or less of a remolding of the facing panels which, being dry, would break; and, furthermore, the trays would be caused to warp.

Any suitable glues may be employed in carrying out the process. Good results have been secured with adhesives of the synthetic resin type in gluing up the facing panels and with blood albumen glue containing some glycerine for gluing the three pre-formed panels of a tray together.

After the trays are completed, as above explained, the edges are, of course, trimmed, the panels being originally large enough for this purpose.

The method which has just been described may be modified somewhat where a different type of core is employed. The main reason why the back facing panels rupture when it is attempted to pre-mold them while engaged with core panels is because the core panels break with some violence at points under too great a tension. By selecting cores which do not rupture more or less explosively, it becomes possible to pre-mold all of the panels for a tray together and at one time. For example, if the core be composed of three thin plies, instead of a single thick ply, the two facing panels and the three core panels may be molded at one time between the same dies. Thus, in Fig. 15, I have shown three core panels 11, and the corresponding facing panels 4 and 5 assembled for pre-molding in the dies B. The completed tray is shown in Fig. 14.

I claim:

1. The method of making a plywood dished structure having a core and veneer facings on both sides, which comprises producing a core and two plywood facing panels, dampening said facing panels and sanding the faces thereof that are the exposed faces in the finished product, molding said panels while damp, and said core into the desired shapes and drying them during the molding process, assembling the core and the panels in a dry condition with dry glue interposed between the same, maintaining the assembly until the moisture therein becomes uniformly distributed throughout the same, and then applying heat and pressure to secure the panels together.

2. The method of preparing a plywood panel to be molded, which consists in dampening a plywood panel to raise its moisture content to a point that will permit molding of the panel, sanding the face of the panel while damp, and then molding the panel into shape before permitting it to dry out substantially.

3. The method of making and preparing plywood panels to be molded, which comprises producing moist wood veneers, gluing the veneers under heat and pressure into plywood panels, dampening the panels to restore their moisture content to about what it was before the gluing step, and then sanding the panels while retaining their moisture.

4. The method of making and preparing plywood panels to be molded, which comprises producing moist wood veneers, gluing the veneers under heat and pressure into plywood panels, dampening the panels to restore their moisture content to about what it was before the gluing step, then sanding the panels while retaining their moisture, and then, while the panels remain damp, molding them into tray shapes.

CHARLES B. NORRIS.